US008132062B2

(12) United States Patent
Stolero et al.

(10) Patent No.: US 8,132,062 B2
(45) Date of Patent: *Mar. 6, 2012

(54) NON-VOLATILE MEMORY SYSTEM WITH SELF TEST CAPABILITY

(75) Inventors: Simon Stolero, Nahariya (IL); Micky Holtzman, Kfar-Vradim (IL); Yosi Pinto, Kfar Vradim (IL); Reuven Elhamias, Kfar-Vradim (IL); Meiri Azari, Maalot (IL)

(73) Assignee: SanDisk Technologies Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/901,267

(22) Filed: Oct. 8, 2010

(65) Prior Publication Data

US 2011/0022898 A1     Jan. 27, 2011

Related U.S. Application Data

(63) Continuation of application No. 10/888,294, filed on Jul. 9, 2004, now Pat. No. 7,814,377.

(51) Int. Cl.
*G11C 29/00* (2006.01)
*G01R 31/28* (2006.01)

(52) U.S. Cl. ........ 714/718; 714/725; 714/726; 714/733; 714/734

(58) Field of Classification Search ........................ None
See application file for complete search history.

(56) References Cited

U.S. PATENT DOCUMENTS 4,276,593 A   6/1981   Hansen
(Continued)

FOREIGN PATENT DOCUMENTS
WO   WO 02/15020   2/2002
(Continued)

OTHER PUBLICATIONS

Kang Lee ; Ng, B. ; Wang, A. ; Kuhn, R. ; Johnson, D. ; Kohler, R. ; Single GSM mixed signal superchip with 96k bytes FLASH and low power micro-controller,1999, IEEE, pp. 103-106.*

(Continued)

*Primary Examiner* — Cynthia Britt
*Assistant Examiner* — Guerrier Merant
(74) *Attorney, Agent, or Firm* — Brinks Hofer Gilson & Lione

(57) ABSTRACT

In a non-volatile memory system, test data may be retrieved by means of a circuit without the help of firmware. The circuit is triggered into action when it detects an abnormality in the processor or host interface. In such event, it formats the self test or status signals from the various blocks in the non-volatile memory system controller and sends a test message to the outside world without the assistance of the system processor or interface controller. When implemented in memory systems with multiple data lines, only one of the data lines may be utilized for such purpose, thereby allowing the testing to be performed while the system is still performing data transfer. Preferably, the system includes the test mode communication controller, which can select between a test channel and a host interface channel for the test message transfer so that the same testing may be performed when the memory system is in the test package as well as in an encapsulated package. The test message is transmitted repeatedly and the test message is structured so that it is easier for the receiver host to decipher the message without a handshake with the memory system. A communication controller preferably detects whether any of the communication channels is not used by the controller of a non-volatile memory system for sending signals and sends diagnostic signals through such channel.

21 Claims, 10 Drawing Sheets

U.S. PATENT DOCUMENTS

| | | | |
|---|---|---|---|
| 4,700,292 | A | 10/1987 | Campanini |
| 4,888,691 | A | 12/1989 | George et al. |
| 5,276,864 | A | 1/1994 | Hernandez et al. |
| 5,568,437 | A | 10/1996 | Jamal |
| 5,732,209 | A | 3/1998 | Vigil et al. |
| 5,805,609 | A | 9/1998 | Mote, Jr. |
| 5,982,681 | A | 11/1999 | Schwarz |
| 6,040,622 | A | 3/2000 | Wallace |
| 6,085,333 | A | 7/2000 | DeKoning et al. |
| 6,279,114 | B1 | 8/2001 | Toombs et al. |
| 6,401,224 | B1 | 6/2002 | Schoniger et al. |
| 6,571,360 | B1 | 5/2003 | Drogichen et al. |
| 6,732,304 | B1 | 5/2004 | Ong |
| 6,732,307 | B1 | 5/2004 | Edwards |
| 6,820,148 | B1 | 11/2004 | Cedar |
| 6,901,457 | B1 | 5/2005 | Toombs et al. |
| 7,107,378 | B1 | 9/2006 | Brewer |
| 7,117,320 | B2 | 10/2006 | Ashmore et al. |
| 7,209,995 | B2 | 4/2007 | Pinto et al. |
| 7,284,175 | B2 | 10/2007 | Wang et al. |
| 2002/0196029 | A1 | 12/2002 | Schmidt |
| 2004/0044485 | A1 | 3/2004 | Kondo |
| 2004/0049724 | A1 | 3/2004 | Bill et al. |
| 2004/0103234 | A1 | 5/2004 | Zer et al. |
| 2004/0130944 | A1 | 7/2004 | Krause et al. |
| 2005/0251714 | A1 | 11/2005 | Nishimura |

FOREIGN PATENT DOCUMENTS

| | | |
|---|---|---|
| WO | WO 02/19266 | 3/2002 |

OTHER PUBLICATIONS

Wilson, James Y., et al., "Inside Bluetooth—Part 1,"*Dr. Dobb's Journal*, Mar. 2000, http://www.ddj.com, 5 pgs.

Wilson, James Y., et al., "Inside Bluetooth—Part 2,"*Dr. Dobb's Journal*, Apr. 2000, http://www.ddj.com, 4 pgs.

ISO/IEC 7816 Standard: "Identification cards Integrated Circuit(s) cards with contacts", Part 1: Physical characteristics, 8 pgs.

"The Multimedia Card System Specification", Version 2.11, Jun. 1999, Multimedia Card Association, Cupetrino, CA, 53 pgs.

"The Multimedia Card System Specification", Version 2.2, Jan. 2000, Multimedia Card Association, Cupetrino, CA, 123 pgs.

"The Multimedia Card Product Manual", Revision 2, Apr. 2000, SanDisk Corporation, 86 pgs.

Notification of Transmittal of the International Search Report and the Written Opinion of the International Searching Authority or the Declaration, Int'l Appl. No. PCT/US2005/024201, Int'l Filing date Jul. 7, 2005 mailed Dec. 21, 2005, 9 pgs.

\* cited by examiner

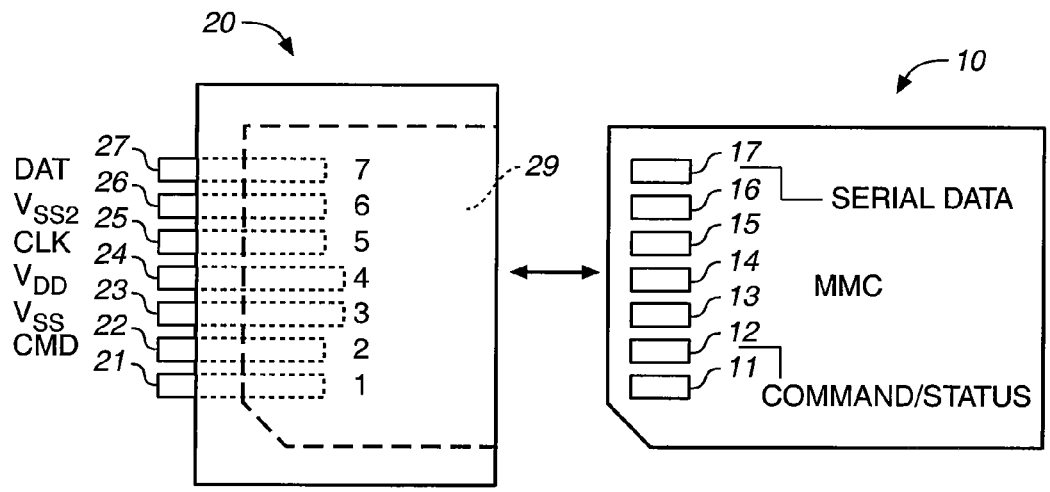
FIG._1
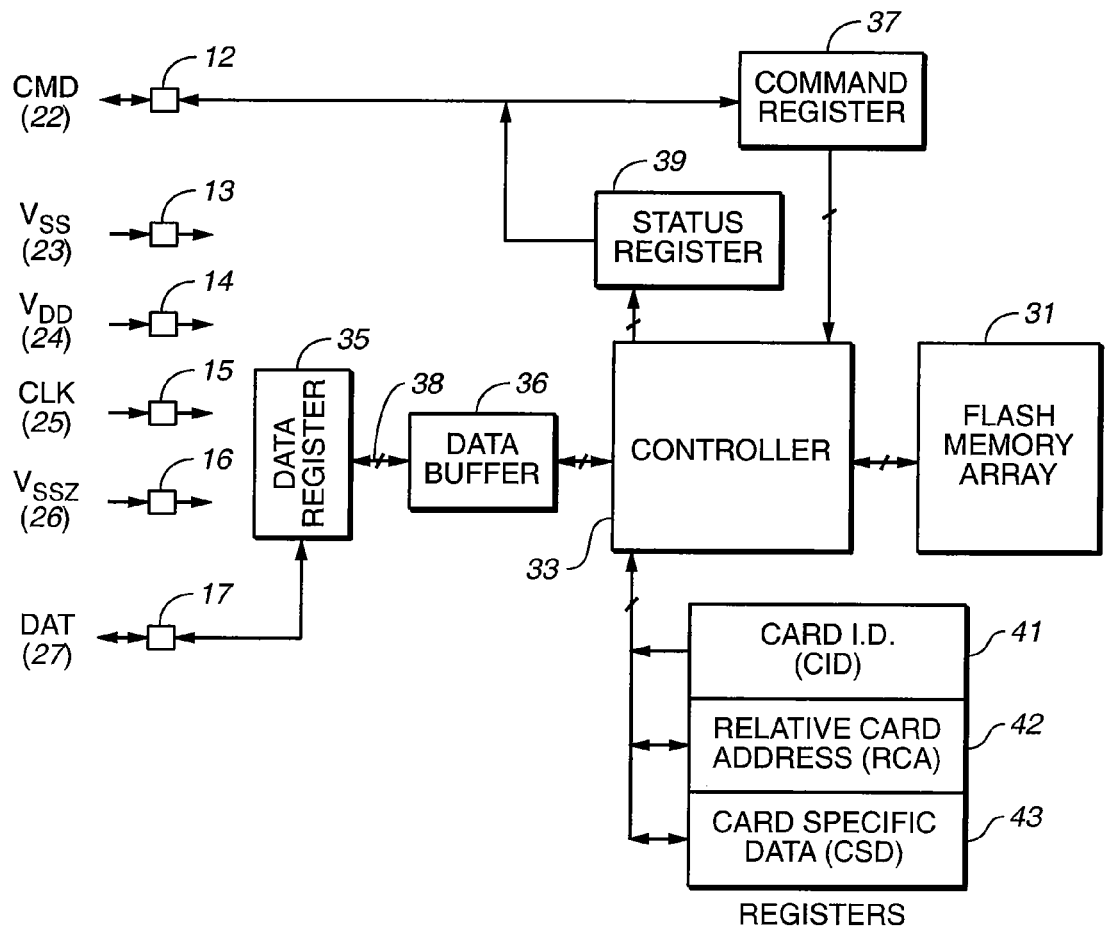
FIG._2

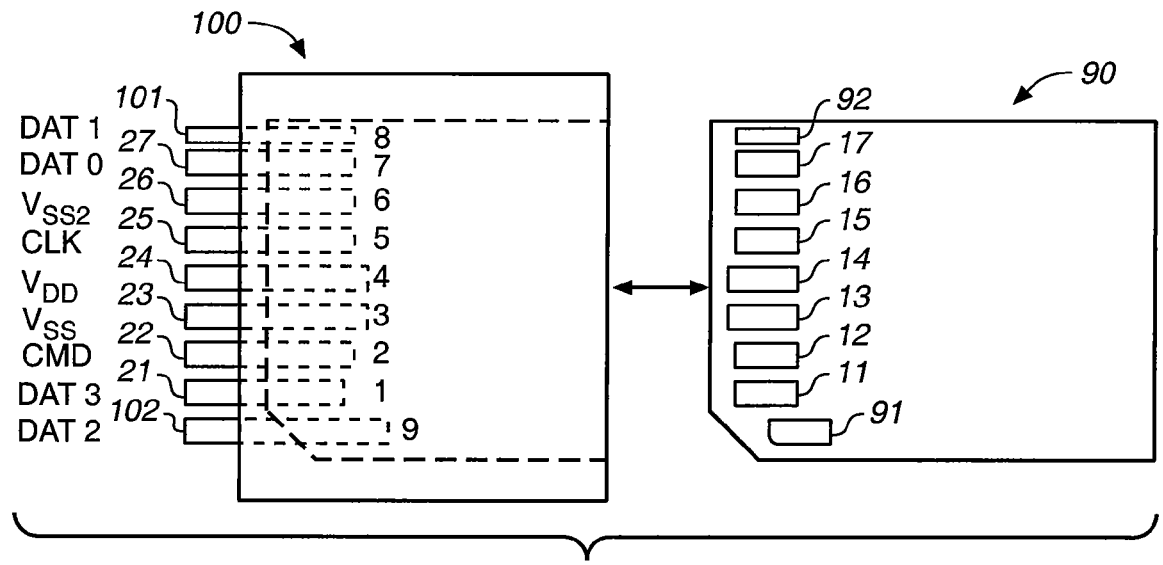
FIG._3
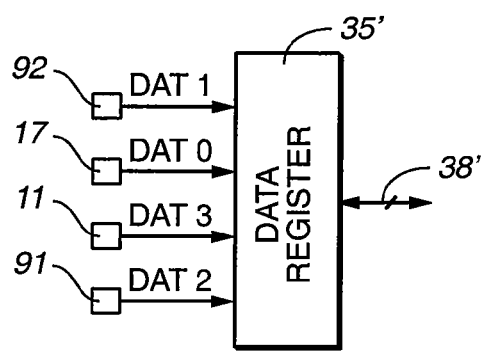
FIG._5

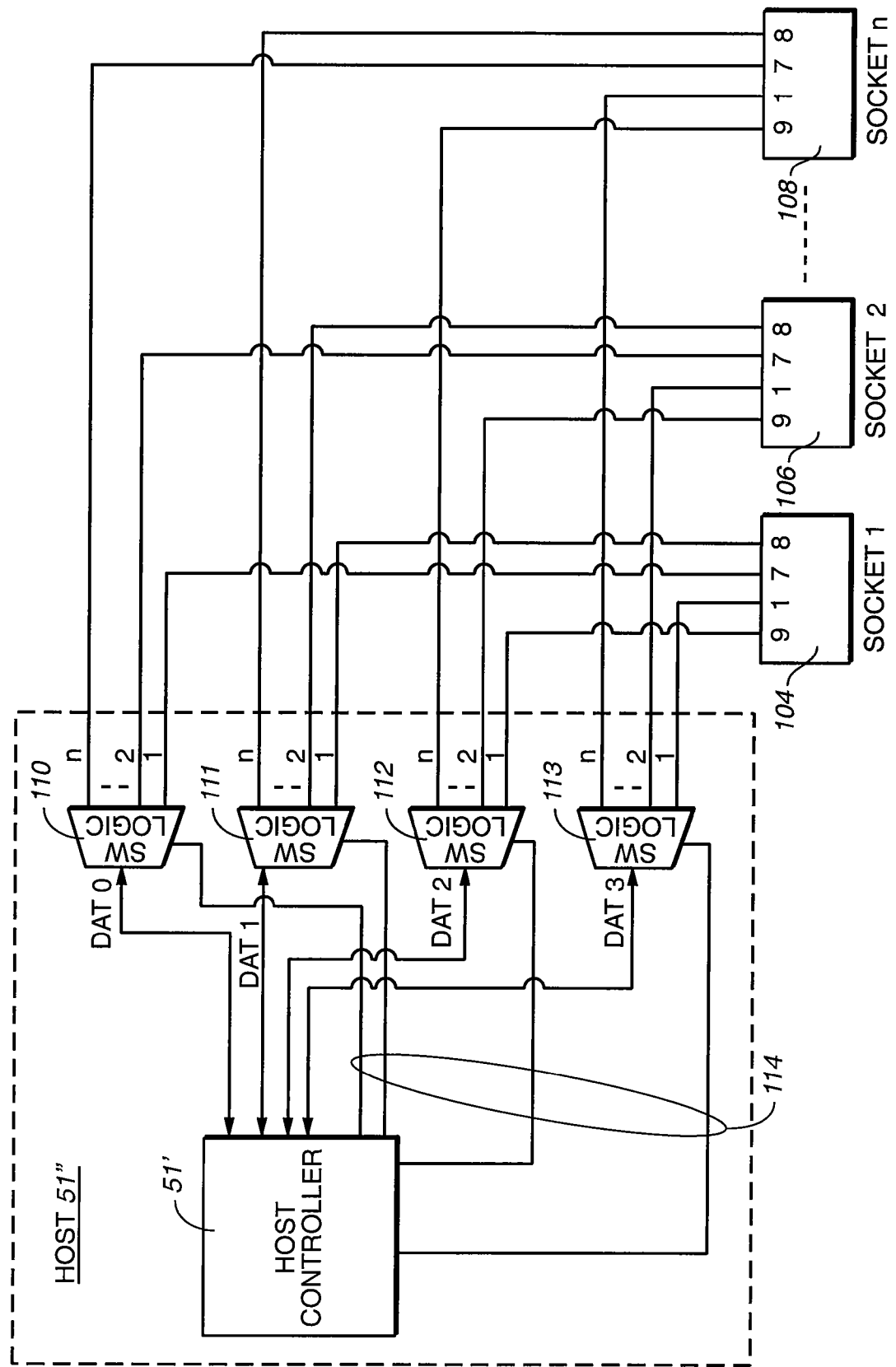
FIG._4

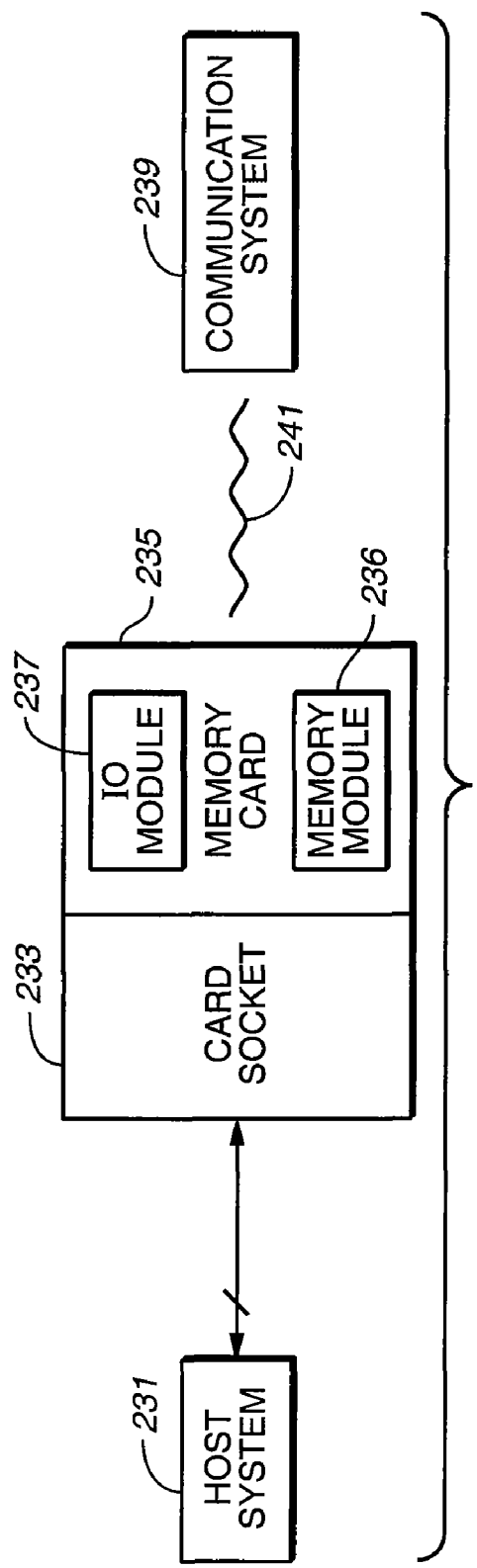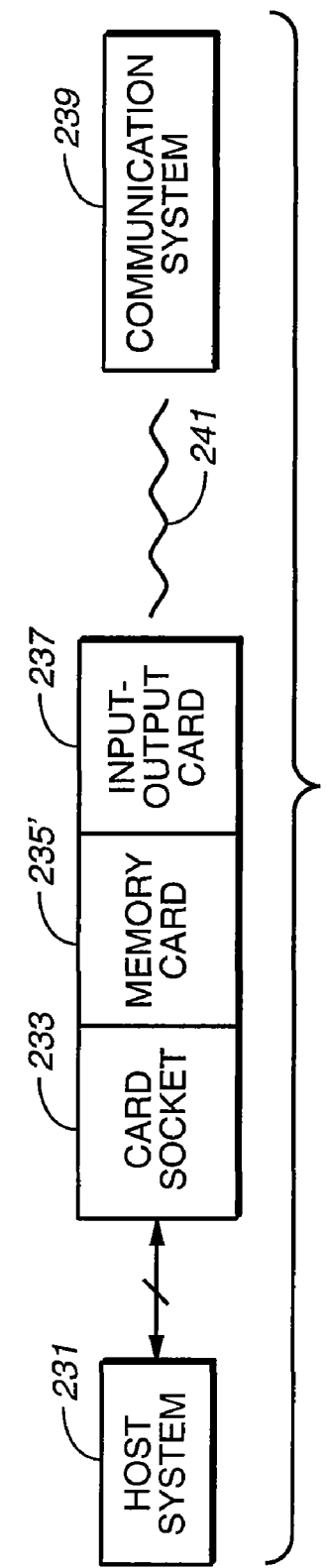

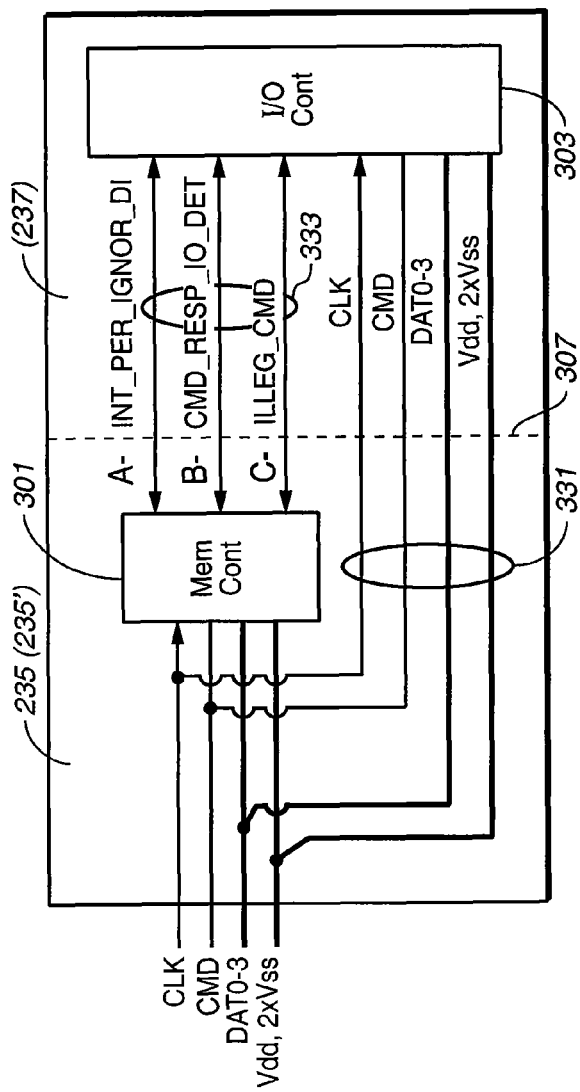
FIG._7A
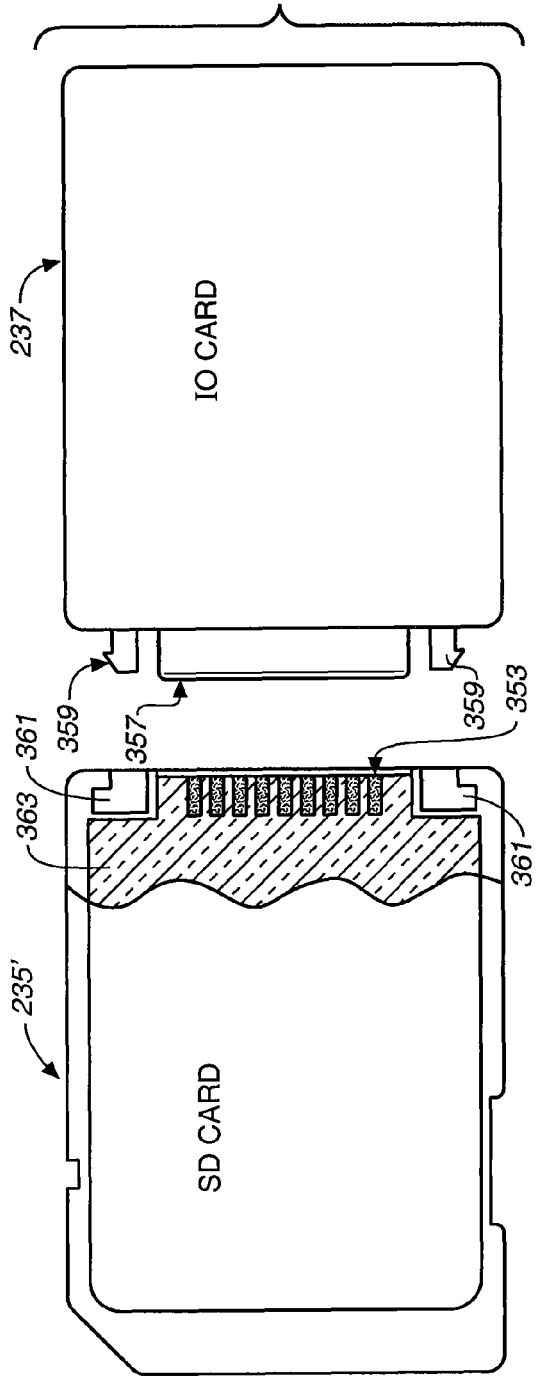
FIG._7B

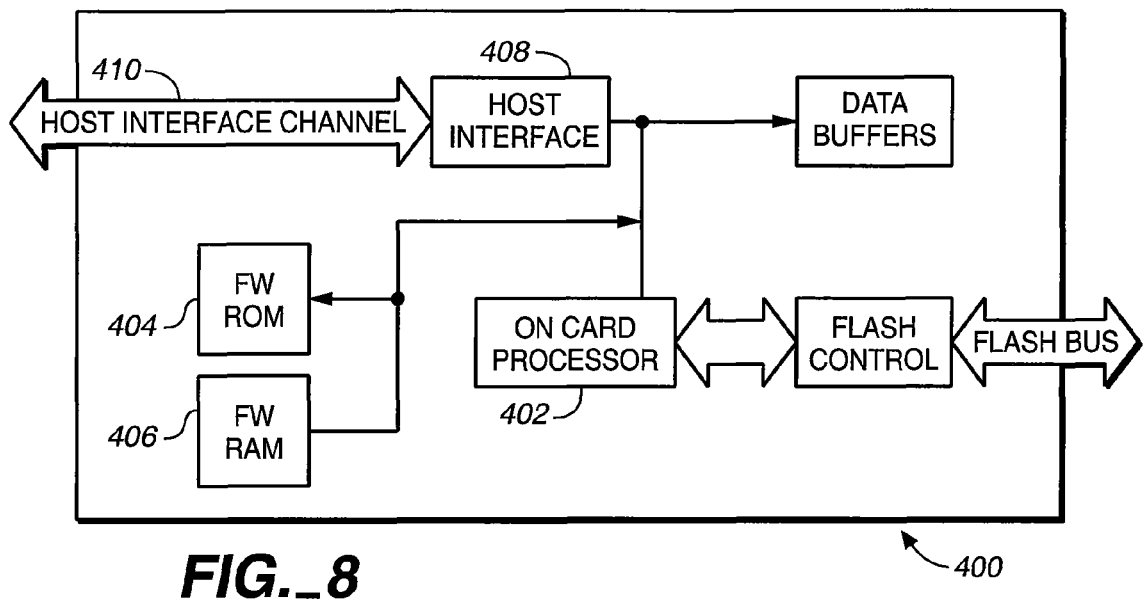
FIG._8
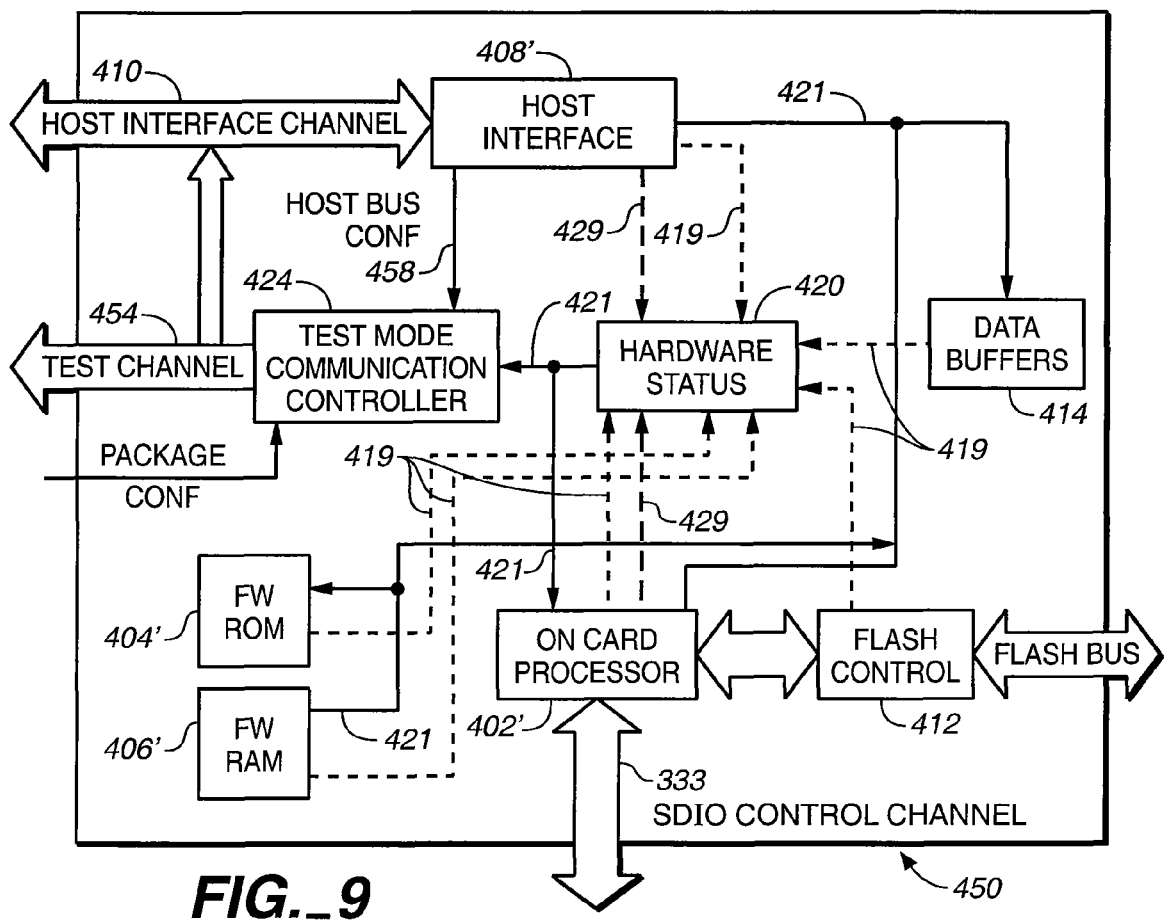
FIG._9

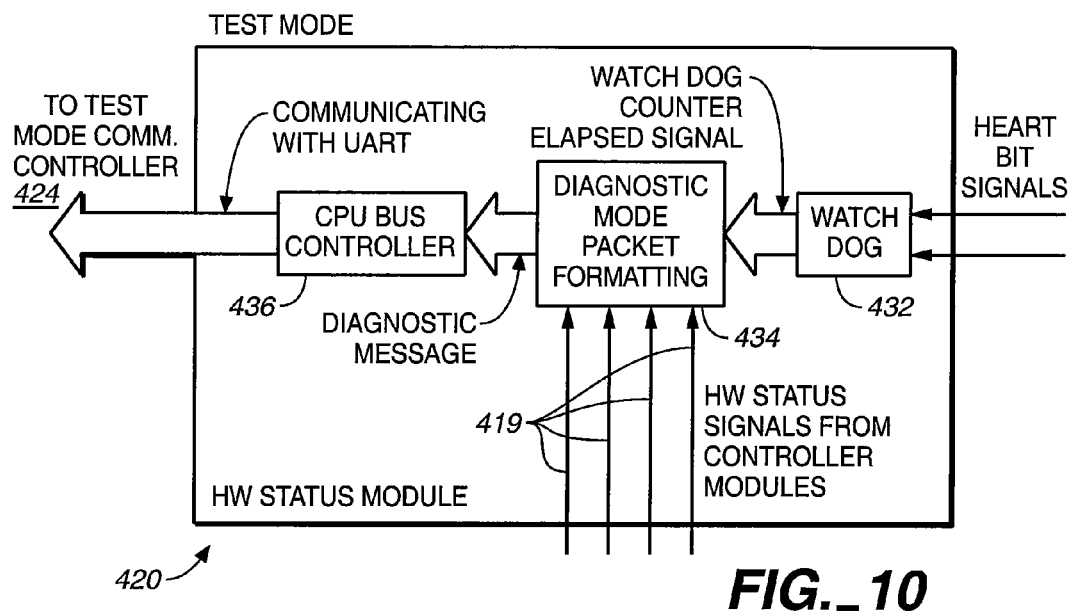
FIG._10
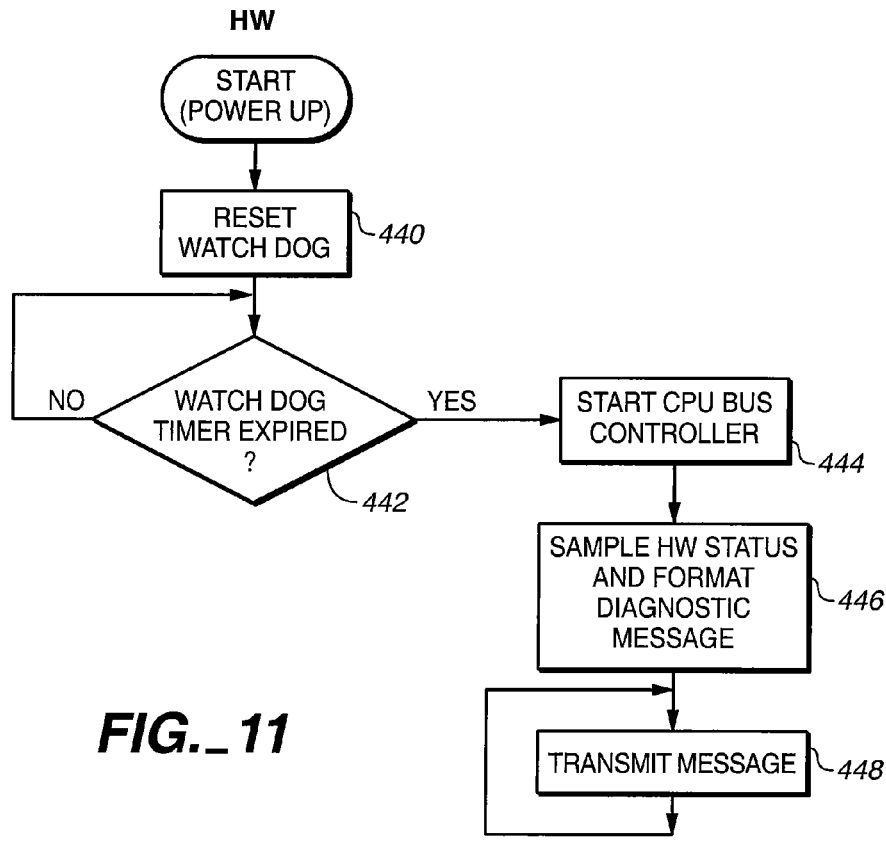
FIG._11

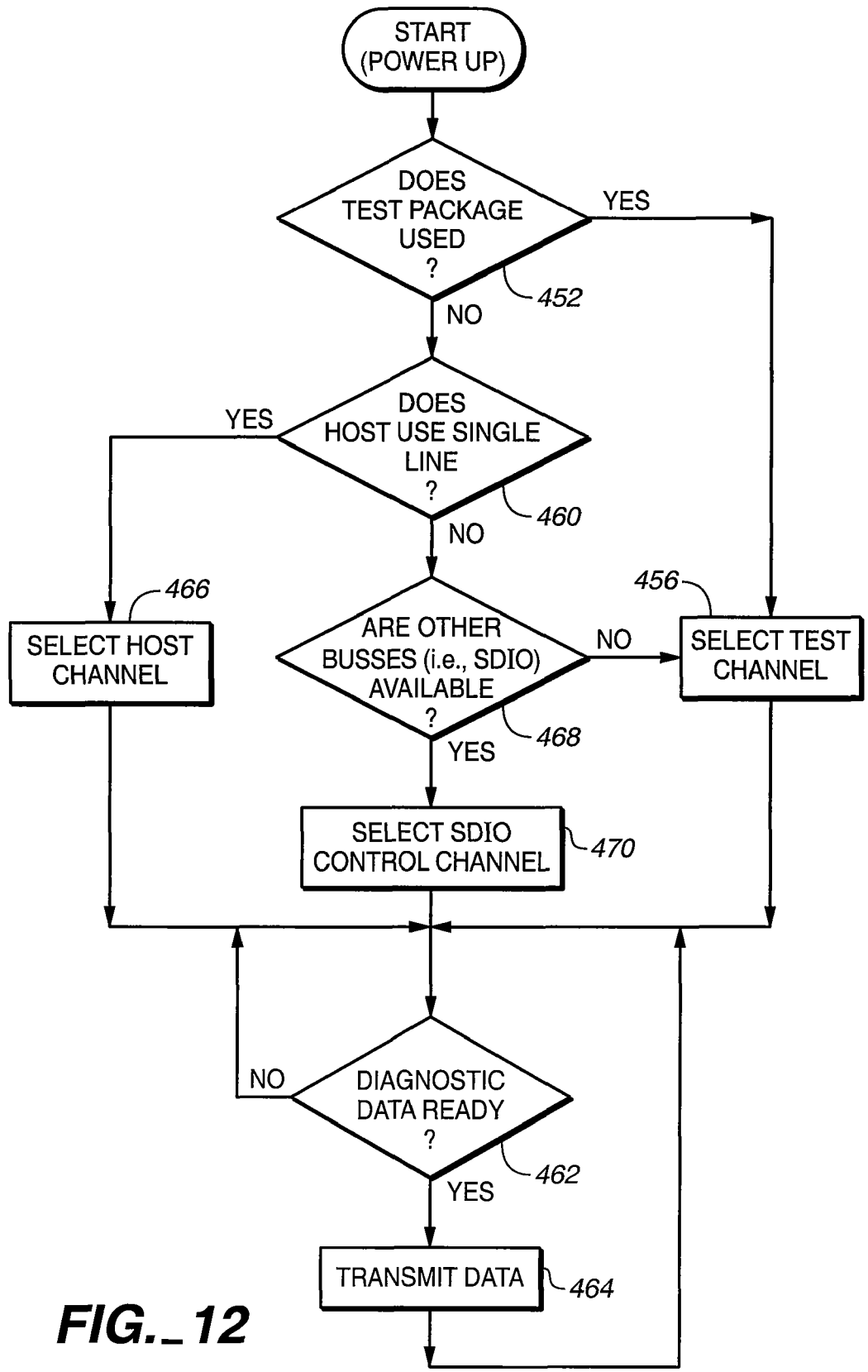
FIG._12

DIAGNOSTIC PACKET FORMAT

**ENSURING HEADER AND MESSAGE
CONTENT DATA IS MUTUALLY EXCLUSIVE**

HEADER BYTE

**ENSURING HEADER AND MESSAGE
CONTENT DATA IS MUTUALLY EXCLUSIVE**

MESSAGE CONTENT BYTE

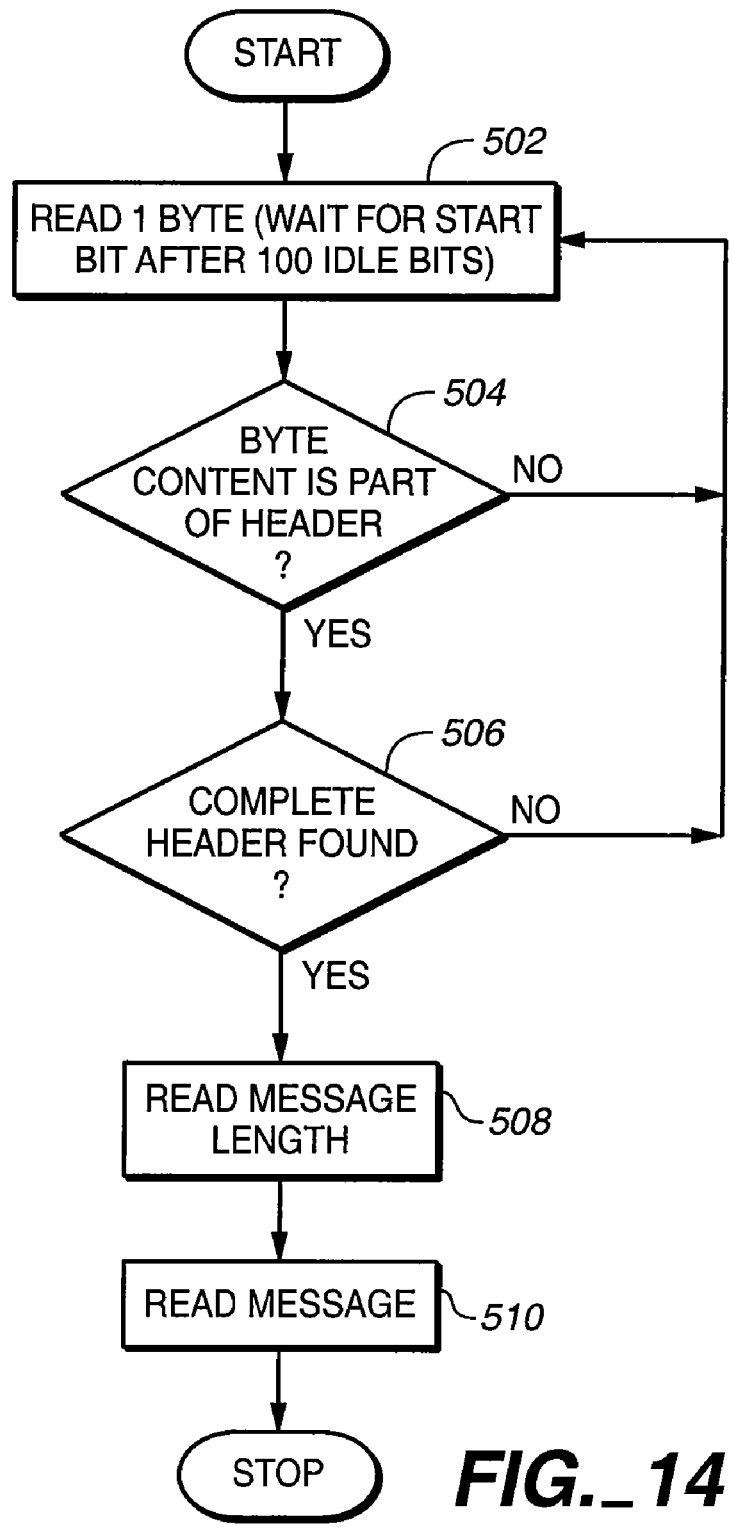
FIG._14

NON-VOLATILE MEMORY SYSTEM WITH SELF TEST CAPABILITY

CROSS-REFERENCE TO RELATED APPLICATION

This application is a continuation of U.S. application Ser. No. 10/888,294 filed on Jul. 9, 2004 (now U.S. Pat. No. 7,814,377), the entirety of which is incorporated by reference.

BACKGROUND OF THE INVENTION

This invention relates in general to non-volatile memory systems and in particular to such systems with self-testing capability.

Various commercially available non-volatile memory cards that are becoming popular are extremely small and have different mechanical and/or electrical interfaces. Examples include the related MultiMediaCard ("MMC") and Secure Digital ("SD") memory cards that are available from SanDisk Corporation of Sunnyvale, Calif., assignee of the present application. There are other cards that conform to standards of the International Organization for Standardization ("ISO") and the International Electrotechnical Commission ("IEC"), an example that is widely implemented being known as the ISO/IEC 7816 standard.

The physical and electrical specifications for the MMC are given in "The MultiMediaCard System Specification" that is updated and published from time-to-time by the MultiMediaCard Association ("MMCA") of Cupertino, Calif. Versions 2.11 and 2.2 of that Specification, dated June 1999 and January 2000, respectively, are expressly incorporated herein by this reference. MMC products are described in a "MultiMediaCard Product Manual," Revision 2, dated April 2000, published by SanDisk corporation, which Manual is expressly incorporated herein by this reference. Certain aspects of the electrical operation of the MMC products are also described in co-pending patent applications of Thomas N. Toombs and Micky Holtzman, Ser. No. 09/185,649 (issued as U.S. Pat. No. 6,279,114) and Ser. No. 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card. Certain aspects of the SD card are described in U.S. patent application Ser. No. 09/641,023, filed Aug. 17, 2000, which application is incorporated herein by this reference.

Cards made according to the ISO/IEC 7816 standard are of a different shape, have surface contacts in different positions, and a different electrical interface than the MMC and SD Cards. The ISO/IEC 7816 standard has the general title of "Identification cards-Integrated Circuit(s) Cards with Contacts," and consists of parts 1-10 that carry individual dates from 1994 through 2000. This standard, copies of which are available from the ISO/IEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner. The small ISO/IEC 7816 cards are commonly used in cellular telephones, among other applications.

In a typical configuration for the above non-volatile memory cards, the card includes a non-volatile memory array and a processor based controller that performs the memory control and host interface function. The memory array and processor based controller are usually encapsulated so that the card is robust when used in many different environments.

When there is a failure in a non-volatile memory card, such as in any of the important blocks that disables the host interface, there may be no way to figure out the problem without disassembling the card and using special test equipment. There are several different "failure" types:

Design problem ("bug")—The hardware/firmware (HW/FW) in the card is not doing whatever it was designed to do.

Production problem—The card was not manufactured properly.

End of life (EOL) problems—The card was operating normally at the beginning but, as a "natural" curse of life it is not working any more.

The assumption is that the bulk of the design problems will be debugged during design phase when the product is not in its final form factor package. Therefore during the design phase, several additional interfaces and plenty of test equipment are available for one to work with. However, manufacturing and EOF issues (as well as the few last bugs) are a fact of life in the non-volatile memory industry and will happen after the product is assembled, making it very hard to debug.

As a solution to the above-identified problem, test interfaces are designed into the card controller memory and printed circuit board (PCB). In order to access these interfaces the product must be de-lidded and in many cases disassembled and reassembled as a collection of discrete components on test boards. This process is both tedious and not reliable. It may also result in damaging the product and losing the data required for debugging. A particular problem is presented when the controller and/or firmware ("FW") are not functioning properly. In such event, it may be difficult to retrieve diagnostic data from the system.

None of the above-described conventional systems is entirely satisfactory. It is therefore desirable to provide a non-volatile memory system with self testing capability where the above-described difficulties are alleviated.

SUMMARY OF THE INVENTION

Using the solution proposed herein below will speed up debug processes, as well as provide a fast and easy way to tell what is wrong with the non-volatile memory system, such as one in the form of a card, before the process of debugging (figuring out why it happened and fix it for future products).

According to one aspect of the invention, a circuit without firmware may be used to transfer self test data for diagnosis when the controller and/or firmware is not functioning properly. Thus, even if the system is encapsulated, it is possible to retrieve self test data without having to disassemble the encapsulated system.

According to another aspect, to avoid requiring any system that is used to receive the self test data for diagnosis to have the correct handshake, the self test message may be sent repeatedly. Preferably the test message contains a header portion and a content portion which can be readily distinguished from one another.

Yet another aspect of the invention is directed to the transfer of built-in test result of the non-volatile memory system through contacts for data transfer. This will provide the outside world with initial data regarding what is going on in the system without the need to disassemble it. In one embodiment, the memory system has more than one contact and at least two modes of operation; in one mode, only one of the contacts is used for data transfer, and in another mode, more than one contact is so used. The built-in test result of the non-volatile memory system is transferred through one or more of the data contacts. Even if the system is encapsulated, it is possible to retrieve self test data without having to disassemble the encapsulated system. Furthermore, where more than one data contacts are available, it is possible to use one or more of the data contacts for test data transfer, leaving the remainder contact(s) for data transfer, so that the non-volatile memory system can be tested while data transfer is occurring.

In another aspect of the invention, a controller uses a plurality of communication channels for sending signals to or from a non-volatile memory. When any of the communication channels is not used by the controller, test data for diagnosis is transferred through at least one of such channel(s) to a device.

The above different aspects may be used individually or together to provide advantageous self-testing capability.

BRIEF DESCRIPTION OF THE DRAWINGS

FIG. 1 shows an existing MMC card and a socket in which the card is inserted.

FIG. 2 is the block schematic diagram of the existing MMC card of FIG. 1.

FIG. 3 shows a SD memory card and socket in which the card is inserted, useful for illustrating the present invention.

FIG. 4 illustrates a memory system utilizing multiple memory card sockets of the type shown in FIG. 3 and having multiple data lines connected to them.

FIG. 5. shows a modification to one element of the MMC card schematic diagram of FIG. 2 that is used in the memory card illustrated in FIG. 3.

FIGS. 6A and 6B illustrate systems in which a non-volatile memory module and an input-output module are utilized respectively in a combination card embodiment and two-part embodiment.

FIG. 7A is a block diagram of an exemplary combination memory/input-output card configuration.

FIG. 7B shows the memory and input-output cards of FIG. 6B with a mating connector.

FIG. 8 is block diagram of a memory card useful for illustrating a conventional technique for retrieving self-test data.

FIG. 9 is a block diagram of a memory card showing an improved technique for retrieving self-test data to illustrate an embodiment of the invention.

FIG. 10 is a block diagram of the hardware status module block of FIG. 9; the hardware status module block receives status signals from the built-in self-test ("BIST") circuits in the different blocks in FIG. 9 for composing a test message to illustrate an embodiment of the invention.

FIG. 11 is a flow chart illustrating the operation of the hardware status module block of FIG. 10.

FIG. 12 is a flow chart illustrating the operation of the test mode communication controller of FIG. 9 to illustrate an embodiment of the invention.

FIG. 14 is a flow chart illustrating the operation of the host receiver of the self-test message to illustrate an embodiment of the invention.

For simplicity in description, identical components are identified by the same numerals in this application.

DETAILED DESCRIPTION OF EXEMPLARY EMBODIMENTS

Figure 13A:
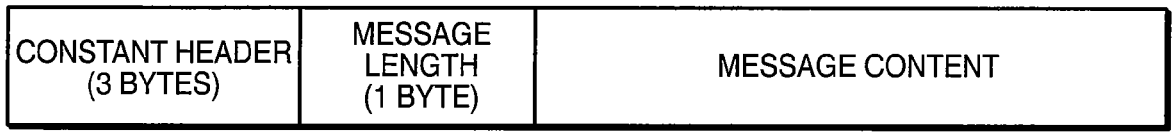
FIG. 13A is a schematic diagram of a diagnostic packet format useful for illustrating an embodiment of the invention.

Before the specific embodiments of the invention are described, it is useful to first review the features of the MMC and SD cards, it being understood, however, that the invention is not restricted to applications involving the SD card. The features of the SD card are outlined in PCT application PCT/US01/25550, entitled "Multiple Removable Non-volatile Memory Cards Serially Communicating with a Host," filed Aug. 14, 2000, which application is incorporated herein by reference in its entirety.

The MMC Card

With reference to FIG. 1, an existing MMC card 10 of the type described in the Background above is insertable into a slot 29 of a socket 20. The card 10 includes a row of seven electrical contacts 11-17 in a surface of the card and extending along one of its short edges. The socket 20 includes seven mating contact pins 1-7 connected to respective lines 21-27. The card contact 12 serially receives command signals from a host and serially sends a response (status signals) to a host. Mating socket pin 2 is thus connected with a command/response ("CMD") line 22. Serial data is received through the card contact 17 for storage in its non-volatile memory, and serial data is sent through the contact 17 when read from the memory. The line 27, connected to the socket pin 7 that mates with the card contact 17, is the socket's serial data ("DAT") line. These two lines 22 and 27, along with a clock signal input line 25, which is connected with the card contact 15 through the socket pin 5, provide an interface with a host computer or other device for operating the memory system within the card 10. Three card contacts 13, 14 and 16 receive an operating voltage from a host system or device, connected through respective socket pins 3, 4 and 6 to external lines 23 ("Vss"), 24 ("Vdd") and 26 ("VSS$_2$"). Card contact 11, and thus the socket pin 1 and line 21, are not used but were included for possible future use.

Pertinent portions of the memory and controller system within each MMC card 10 are illustrated in FIG. 2. An array 31 of flash EEPROM cells provides non-volatile storage of digital data. A controller 33 manages operation of the array 31 and interfaces with a host system through the card contacts 12-17. Data serially received through the contact 17 are written to a register 35, transferred in parallel into a data storage buffer memory 36, from the buffer 36 to the controller 33 and then to the memory cell array 31 for storage therein. Conversely, data read from the memory cell array 31 are transferred in parallel by the controller 33 into the buffer 36 and from the buffer 36 in parallel into the register 35. The read data are then serially transferred out of the register 35 through the card contact 17.

Similarly, commands from a host are sent serially through the contact 12 and stored in a register 37, and then read in parallel by the controller 33. Status information is loaded by the controller 33 in parallel into the register 39, thereafter to be read serially through the card contact 12. The types of commands and responses that are transferred in this way are many. For example, if a host wants to write data into the array 31, it sends a write command through the CMD line 22, followed by the data to be written being sent through the DAT line 27. After the commanded write operation is completed, the controller 33 writes a status indication thereof in the register 39 and the host can then read that status to confirm that the commanded operation has been completed.

Several other registers are provided in the MMC card 10, three of them being shown in FIG. 2. A memory card identification CID register 41 is not re-writeable by the user but rather is read-only to provide the host with an identification that is unique for each card. A relative card address register RCA 42 is written by the host in a multi-card system during initialization, and when the card is added or replaced in a system, with an address that is thereafter used by each card to determine whether a command on the common CMD line 22 is intended for that card or not. The relative address only needs to be a few bits in length, depending upon the number of cards within a system that need to have unique addresses. This is much shorter than the manufacturer's unique identification that is stored in the CID register 41, and thus its use speeds up addressing the card. Where a card has been previously selected, the host directs its command to the selected card. Where no card has been previously selected, each command from the host is accompanied by or includes the relative address previously written into the RCA register 42 of one card in the system, and that card then responds to carry out the command while the other cards of the system, having other relative addresses written into their RCA registers 42, do not respond.

A card specific data register 43 ("CSD") includes information of the data format, data access characteristics, and similar information of the particular memory array 31 and controller 33. Most of this data are written by the manufacturer and so cannot be rewritten by the user. The CSD register data is used by the host to set its parameters in communicating with the cards of a system, including the format of data being transferred, how that data is accessed, and similar matters.

The SD Card

The rate at which data is transferred between the host and an individual card can be increased by increasing the number of data lines connected to each card socket over which data are simultaneously transferred. In the SD Card for example, four data lines are used, which contribute to increase the rate of data transfer by up to four. Data is transferred over only one of the multiple data lines between a host and an MMC card. In the specific implementation of the SD Card, the number of data lines used at one time is either one or four.

The SD Card 90 and mating socket 100 are shown in FIG. 3. The SD Card 90 has the same contacts 11-17 as the MMC card 10 of FIG. 1, and in the same relative positions, but also has two new contacts 91 and 92 added for the transmission of data. The spare contact 11 of the MMC card is now also used by the SD Card for data transfer. Thus, four contacts 11, 17, 91 and 92 are used by the SD Card for transferring data into and out of the memory within the card 90. A mating socket 100 (FIG. 3) similarly has the same pins 1-7 as the socket 20 of FIG. 1, plus two additional pins 8 and 9. The result is four data lines 27 (pin 7), 101 (pin 8), 102 (pin 9), and 21 (pin 1) connected to each card socket.

The modified system is shown in FIG. 4, where a host 51" enables transfer of data over more than one data line to multiple sockets 104, 106 and 108 that individually have the structure of the socket 100 (FIG. 3). The four data lines 21, 27, 101 and 102 are commonly connected to each of the sockets and to host 51" through switching logic circuits 110, 111, 112 and 113. Up to four bits of data on four data lines DAT 0, DAT 1, DAT 2 and DAT 3 may be stored simultaneously into a card inserted into one of the sockets 104-108 selected by control signals on lines 114 from the host controller 51' applied to the four switching logic circuits 110-113, which may be controlled by the control signals so that a number of cards inserted into the sockets may be written into in time sequence. Similarly, when data are being read from a card inserted into one of the sockets 104-108, up to four bits of data on four data lines DAT 0, DAT 1, DAT 2 and DAT 3 may be read from this card as controlled by control signals on lines 114 applied to the circuits 110-113.

One of the switching logic circuits 110-113 is provided for each of the multiple data lines that are connected to the card sockets, circuit 110 for data line DAT 0, circuit 111 for data line DAT 1, circuit 112 for data line DAT 2 and circuit 113 for data line DAT 3. They are controlled by signals on the lines 114 to the host controller 51'. During a write operation to a card in any one of the multiple sockets 104, 106 and 108, each of the switching logic circuits 110-113 has one of its four outputs connected to its single input. When data are being read from one of the cards, each of the circuits 110-113 is switched to connect to its single output line, only one of its four input lines that is connected to the socket in which the memory card being read is inserted.

In order to accommodate the multiple data lines, the data register 35 of FIG. 2 and its operation, are modified in the SD Card, in a specific example, in a manner shown in FIG. 5. During writing, the host controller 51' (FIG. 4) applies simultaneously the appropriate number of data bit(s) to one, some or all of the four data lines DAT 0, DAT 1, DAT 2 AND DAT 3, depending upon the number of data lines selected by the host for the writing operation. These up to four streams of data are received by the data register 35' and then transferred in parallel through lines 38' to a data buffer like the buffer 36 of FIG. 2.

Although the data transfer rate of any one of the data lines is limited, the simultaneous transfer of data over multiple data lines increases that rate by a multiple that is equal to the number of data lines. If two data lines are being used, for example, a data stream will have one-half the rate as that of the case where all four data lines are used.

Conversely, when data are being read from the memory, the data are loaded in parallel into the register 35' and sent over the data lines, depending upon the number of data lines being used.

It is desirable for the system of FIG. 4 to be able to accept cards having a varying number of data line contacts, one, two or any other number up to the number of data lines provided in the system (four such lines in this example), and to be able to freely intermix and interchange such cards in the system. For some applications, the high data transfer rate provided by the number of data lines of a system, four in this case, is not necessary. For those applications, a version of the SD Card is made with a lesser number of data pins. An accompanying reduction in the amount of interface circuitry in the card also occurs, and thus the card's cost is reduced. Cards with two active data pins are useful, as are those with only one.

In order to be able to use cards with different numbers of data lines in the same system, a read-only field is preferably provided in the individual cards that is read by the host to determine over how many data lines it can communicate with that card. In a specific implementation, this is included in an SD Card Configuration Register ("SCR") that is added to the registers shown in FIG. 2 for the MMC card. The host 51" reads this field upon power-up, initialization at some other time or whenever a new card is inserted into a socket, and thereafter transfers data addressed to each card over the number of data lines that the card can accommodate. But since there is some cost involved to provide additional circuitry necessary for each added data line, some cards are designed to work with a lesser number of data lines. Conversely, the host can be designed to operate with a lesser number of data lines than possible. If the added speed of data transfer is not necessary for a particular application, then the added complexity and cost to provide the higher data transfer rates can be avoided, both in cards and in host systems.

Embodiments with Input/Output Modules

Embodiments of non-volatile memory cards with input/output ("I/O") modules that provide additional input and output capability, such as for data input and output, are described in U.S. application Ser. No. 10/732,149, filed Dec. 9, 2003, which is incorporated by reference herein. Some of the embodiments in this application are described below.

In still another variation of the removable electronic circuit card, the card 235 of the embodiment of FIG. 6A includes, in addition to a memory module such as indicated at 236, an input-output module 237. The input-output module 237 communicates directly with some other system 239 over a communications path 241. The communications path 241 can be wireless, such as by use of an infrared or radio frequency signal, or can include a wired connection. If by wires, the card 35 includes an external socket to removably receive a plug that is attached to the wires. If wireless, the card 235 includes an antenna within it, if using radio frequency communication, or an infrared emitter and detector, if infra-red communication is being used. An emerging standard for radio frequency data communication has been published as the Bluetooth Specification, which is discussed by Wilson and Kronz, in two articles entitled "Inside Bluetooth Part I" and "Inside Bluetooth Part II", appearing in the issues of Dr. Dobb's Journal for March, 2000 (beginning at page 62) and April 2000 (beginning at page 58), which articles are incorporated herein by this reference. Other wireless schemes include those based on the 802.11 protocol, such as WiFi, and ultra-wideband (UWB) technologies. The transfer of data over the communications path 241 will usually be in two directions but can certainly be limited to one direction or the other for specific applications.

In some applications, the incident signal 241 may not explicitly originate with an external system 239. For example, the input-output module 237 could contain a photosensor or lens integrated into the card in order to function as a camera module. In this case, the signal 241 would be the incident radiation and the card would form a stand alone unit and would not need to interact through a cable or antenna with any entity but the host.

In the exemplary embodiment of FIG. 6A, the combination card 235 including the input-output module 237 is based on the SD memory card as described above. Card 235 is compatible with the SD memory in electrical, power, signaling and software. The intent of the combination card 235 is to provide high-speed data I/O with low power consumption for mobile electronic devices. A desirable result is that a combination card inserted into a non-combination card aware host will cause no physical damage or disruption of that device or its software. In this case, the combination card should simply be ignored. Once inserted into a combination card aware host, the detection of the card will be via the normal means described in U.S. patent application Ser. No. 09/641,023, incorporated by reference above, with some extensions. In this state, the combination card will be idle and draw a small amount of power (15 mA averaged over 1 second). During the normal initialization and interrogation of the card by the host, the card will identify itself as a combination card device. The host software will then obtain the card information in a tuple (linked list) format and determine if the card's I/O function(s) are acceptable to activate. This decision will be based on such parameters as power requirements or the availability of appropriated software drivers. If the card is acceptable, it will be allowed to power up fully and start the I/O and function(s) built into it. More details on the operation of the exemplary embodiment of FIG. 6A is given in co-pending U.S. patent application Ser. No. 10/302,009, filed on Nov. 21, 2002, which is incorporated herein by reference.

An alternate exemplary embodiment is shown in FIG. 6B, where the memory module and input-output modules are on separate cards. The alternate exemplary embodiment includes a modified memory card, such as the memory card 235, by adding a connector. The modified card is identified as 235' in FIG. 6B. The connector attaches to a mating connector of an input-output card 237 in order to mechanically and electrically couple the two cards together. The input-output card 237 communicates directly with some other system 239 over a communications path 241. More details on the operation of the exemplary embodiment of FIG. 6B, including the mechanical aspects of the card to card attachment, are given in co-pending U.S. patent application Ser. No. 09/653,062, filed Sep. 1, 2000, which is incorporated herein by reference.

Although the exemplary embodiments of FIGS. 6A and 6B, as well as most of the following discussion, are based on two modules, specifically a memory module and an input-output module, more generally there can more modules distributed among a single card, as in FIG. 6A, or multiple cards, as in FIG. 6B. In either case, however, only one card will be attached to the host. For example, 235 of FIG. 6A can contain multiple I/O modules, or in FIG. 6B card 237 can contain multiple input-output modules or card 235' can have multiple input-output cards attached. Generally, the various aspects of the present invention will be described for a single card connected to a host. The card will either contain multiple modules within the card itself (a "combo card") or have one or more cards, which themselves contain modules, connected to the host through it.

The exemplary embodiments will also be described for the case where the card (or cards) is able to communicate with the host through a plurality of protocols, such as is described in U.S. patent application Ser. No. 09/186,064 which is incorporated herein by reference. Specifically, these will be the SD (described in U.S. patent application Ser. No. 09/641,023 incorporated by reference above) protocol and the SPI protocol in the exemplary embodiment.

FIG. 7A is a block diagram of an exemplary embodiment for a combination card 235 conforming to the appropriate SD card standards and having a memory module and input-output module. In the memory module, only the controller 301 is explicitly shown and, similarly, only the controller 303 is shown in the I/O module. The I/O module (which can contain multiple I/O functions) is here designed to work together with the specific card type selected and complies with the appropriate specification as incorporated above. Also as noted above, the embodiment is taken to support both SD bus and SPI bus modes, as described in the incorporated references. The bus structure by which the modules exchange data and commands with the host is shown at 331. In particular, the bus conforms to the SD standard and includes a clock line CLK, a command line CMD, data lines DAT0-3, and power supply lines at Vdd and Vss. For a two card implementation, the broken line 307 indicates a boundary between a memory card (235') that connects to the host directly and an input output card (237) that connects to the memory card. The bus 331 again extends through both cards and connects to both controllers.

The scope of the following discussion will mainly define the functional characteristics of the SD card with the I/O expansion slot, along with related electrical and timing issues. In the embodiment of FIG. 7A, both the memory controller 301 and the I/O controller 303 are connected on the same bus for communicating with the host. Thus each module would be able to independently communicate with the host, but the host still sees only a single card. For the exemplary protocols, this results in only a single relative card address (RCA) being defined for the card in SD or MMC mode and only single chip select (CS) signal being used for the card in SPI mode, even though the card (or cards) will contain more than a single module. To facilitate the operation of multiple modules connected in parallel to the host while still allowing the host to see them as a single card, the connection 333 is implemented between the two controllers.

The exemplary connection has three control lines, A, B, and C through which the controllers can exchange signals to allow the modules to sort out which commands and data from the host are meant for which module. As both modules are identified by the host by the same relative card address (RCA) or chip select (CS) signal, but many commands are specific to just one module, the control lines allow the modules to facilitate these host interactions. For example, if the host sends a command specific to the I/O module followed by some data, the memory module would interpret the command as illegal. Instead, the control lines 333 allow the I/O controller 303 to inform the memory controller 301 that the command is not illegal, but, rather, intended for the I/O module and that the memory module should ignore the following data. In the exemplary embodiment, it will be assumed that most commands are specific to one module or the other, with a small number of commands shared in common. Examples of such common commands are a card reset command, commands related to establish a RCA for the card as a whole, commands related to CS signals, and other commands that allow the largely independent modules to function as a single card as viewed from the host. Other commands may also be common to both modules, such as commands related to DMA type transfers between the modules that are described further in patent application Ser. No. 10/302,009.

The interface control lines will be described in more detail, beginning with line [A]. Line [A] is also labeled INT_PER_IGNOR_DI on FIG. 7A and has a dual functionality, depending on whether the communication is in SD mode, where it functions as a VALID MEMORY INTERRUPT PERIOD line, or in SPI mode, where it function as a IGNORE DI INPUTS line. In SPI mode, data and commands/responses are sent serially, coming in on the CMD (now the data in, or DI) line and out on the DAT0 (now the data out, or DO) line. As both modules are connected in parallel, both modules are listening in on the SD bus 331 and data/commands sent to one module might be interpreted by the wrong module. Line [A] in the SPI mode is used one controller to indicate to the other controller to ignore DI input. Default is implemented as pull-up mode. "0" set by one of the controllers (IO or Memory) indicates to the other controller to ignore DI input. The reason for control line [A] is that the data which was sent to one controller may be interpreted as a command by the other controller. Since both controllers will not receive data at the same time, the same control line [A] will be used from I/O to Memory and from Memory to I/O.

In SD mode, line [A] is used for a sending a VALID MEMORY INTERRUPT PERIOD signal from the memory module to the I/O module, as shown in FIG. 7A. This signal indicates that the I/O controller 303 is allowed to send an interrupt to the host according to the SD bus protocol, since if the I/O module sends an interrupt to the host on the bus 331 at a non-allowed time, this may corrupt data being exchanged between the memory module and the host. The I/O controller 303 must check this line before sending interrupt to the host. "1" indicates valid Interrupt period and "0" indicates a non-valid interrupt period. As described in the various references incorporated above, in SPI and 1-bit (or narrow) SD mode Pin 8 (DAT1) is used as interrupt signal. In 4-bit (or wide) SD mode Pin 8 (DAT1) is used for data transfers and for interrupt signal. Line [A] is used to prevent bus contention on Pin 8 while working in 4-bit SD.

Line [B] is also labeled CMD_RESP_IO_DET on FIG. 7A and also has more than one functionality, depending on whether the device is in a command response period, where it functions as a command response indication line, or is not in a command response period, where it functions as an I/O card detection line. During non-command response periods, the memory controller is in input mode on line [B], which is used by the I/O controller to indicate that I/O card is present. Of course, in single card embodiments, the I/O module will always be present as it is on the same card; but in cases where a module is on a separate card, such as 237 in FIG. 6B, this allows the card that is directly connected to host (i.e., 235') to know that the second card (i.e., 237) is attached. Otherwise, if there is no response on bus 331 to a command, it would not be clear to the controller 301 whether the card 37 was absent, or whether controller 303 was just not responding. The I/O card's controller 303 drives line [B] 'low' at all times except for one clock after the end bit of command until some number of clocks after the end of the command. This period is referred to as 'response period' in the following. In case that the I/O card is not connected, the line is pulled up. In order to eliminate marginal timing problems the memory controller will consider line [B] as I/O card detection indication a few clocks after the end of the response period.

During a command response period, line [B] is used by one controller to indicate to the other controller that it is responding and that the other controller need not respond. This helps to manage traffic on the system bus and keeps both controllers from responding at the same time. During a command response period, line [B] indicates that a command is responded to in both SD and SPI modes. In default, the memory and I/O controllers are in input mode. By driving line [B] 'low' by one of the controllers (I/O or memory) indicates to the other controller that the driving controller is sending a command response.

Line [C] is also labeled ILLEG_CMD on FIG. 7A, is used in SD mode, and has a dual functionality. According to the SD specification, if an illegal command is sent to a controller, on the next command it will indicate that the previous command was illegal. The illegal command flag also sets a flag so that this information can be sent on the next (legal) command. However, this next command may not be directed to the same module, so this illegal command information needs to be shared between the controllers. For example, the illegal command may be to the memory module, whereas the next, legal command is to the I/O module that would otherwise have no knowledge of the preceding illegal command.

The mechanical and electrical interconnection of the memory and input-output cards 235' and 237 of FIG. 6B is illustrated, according to one embodiment, in FIG. 7B. An SD card 235' is shown in FIG. 7B from its side opposite to that containing the external contacts. A connector 353, for coupling with an input-output card 237, is provided at an end of the SD card 235' opposite to the end carrying the card's external contacts. The connector 353 is shown with a covering portion of the card outside shell removed, where the covering portion together with portions shown in FIG. 7B that are not removed (e.g. printed circuit board 363) define a slot in connector 353 for receiving a mating connector 357 of input-output expansion card 237. The mating connector 357 is included along an edge of the input-output card 237. A pair of pins 359 are carried by the card 237 and extend outward from its end on opposite sides of its connector 357. Mating apertures 361 are included on the edge of the card 235' on opposite sides of its connector 353. When the cards 235' and 237 are urged together, the pins 359 are inserted into their mating apertures 361, with the pins 359 flexing sufficiently for their pointed sides to be caught within detents of their mating apertures 361. This prevents the cards from being pulled apart until the pins 359 are flexed to release their engagement with the detents of the apertures 61. While so attached, the mating connectors 353 and 357 also establish electrical connection between the two cards. The above-described configuration in FIG. 7B is similar to that in PCT/US01/27362, with publication number WO 02/19266, filed Aug. 30, 2001, which application is incorporated herein by reference. Lines A, B and C may comprise a set of any three of the electrical contacts of connector 353 and a corresponding set of any three of the electrical contacts of connector 357 when the two sets are electrically connected together. The contacts of connector 353 for lines A, B and C are therefore located close to or at the slot.

EXEMPLARY EMBODIMENTS

FIG. 8 is a block diagram of a memory card illustrating a conventional technique for retrieving self-test data. In a conventional technique, diagnostic data is verified and reported by the firmware stored in the read-only memory (FWROM) and/or the random access memory (FWRAM). The firmware will use the host interface 408 and the host interface channel 410 for transmitting the self-test message. Alternatively, when the memory card is still being tested prior to encapsulation, such message may be transmitted through a test channel (not shown in FIG. 8). The above conventional technique, however, will function properly only when the on card processor, host interface and firmware are functioning properly. When they are not, it may be difficult to retrieve the self-test data. In many situations, this can only be done by disassembling the memory card and reassembling them for testing purposes. However, such process may damage the components of the card and cause the test data to be irretrievable. It is, therefore, desirable to provide an improved technique for retrieving the test message.

One aspect of the invention is based on the recognition that a circuit without FW may be used for the purpose of gathering the self-test data and sending it when other ways for retrieving self-test data fails. In one embodiment of the invention as explained in more detail below, a communication controller (such as UART, HDLC, etc.) as well as BIST (built in self test) units or status circuits and a hardware status block (FIG. 10) may be added which will continuously transmit diagnostic information out of the card even when the FW and/or host interface is not operating properly to perform such function. The BIST may be embedded inside the various blocks.

FIG. 9 is a block diagram of a memory card with improved self-test data retrieval capability. As a solution to the above-described problem of test data retrieval, applicants proposed a hardware status circuit 420, which receives the self-test data or status signals from the built in self test or status circuit ("BIST", not shown in FIG. 9) located within each of the following blocks: processor 402', ROM 404', RAM 406', host interface 408', flash control 412, and data buffers 414. Flash control 412 is connected to and controls a flash memory array, such as array 31 in FIG. 2. The self test or status signals from the BISTs in these blocks are sent by these various blocks to hardware status block 420 as indicated by the thin dashed arrows 419 in FIG. 9. When the hardware status block 420 detects an abnormality of the processor 402' and/or host interface 408', the hardware status block takes over the function of retrieving the self test or status signal information from the various blocks in memory card 450. Processor 402' or host interface 408', or both, generates a heart bit signal, which may be any periodic signal. The heart bit signal(s) are sent to the hardware status block 420. In one embodiment, the sending of this heart bit signal at regular time intervals indicates that both blocks (host interface and processor) are functioning properly and capable of communication with the outside world. When the hardware status block 420 determines that either the processor 402' or host interface 408', or both, stops sending the heart bit signal to block 420, then the hardware status block takes over the function of retrieving the self test or status signal information from the various blocks in memory card 450. Memory card 450 may be any one of the above-described types of memory cards, as well as types not described herein if they perform some of the same functions. The self test or status signal may statistics concerning the controller and/or memory.

Hardware Status Module

FIG. 10 is a block diagram of the hardware status block 420 of FIG. 9. Preferably, block 420 contains no firmware. As shown in FIG. 10, block 420 includes a watchdog timer 432, a diagnostic mode packet formatting block 434 and a CPU bus controller 436. The operation of the hardware status module block 420 is illustrated in FIG. 11. First upon power up, the watchdog timer 432 is reset (block 440). The watchdog timer 432 is reset by the heart bit pulse from either processor 402' or host interface 408', or both, and failure to receive a heart bit pulse at an expected time or after a predetermined time period will cause the watchdog timer to lapse, which will signal to the diagnostic mode packet formatting block 434 that either the processor 402' or the host interface 408', or both, is not functioning properly and that the hardware status module block should take over the function of retrieving the self test and status signals and communicate the status of the various blocks to the outside world. Block 434 sends a signal to the bus controller 436 which then takes control over the CPU bus 421 indicated in FIG. 9, which bus comprises most of the internal signal lines in FIG. 9. The diagnostic mode packet formatting block 434 samples the hardware status of the various blocks in the memory card from the signals sent to the hardware status module block by the BISTs in such blocks, and formats a diagnostic message. The package format is a few bytes long and will be described below. See diamond 442, and blocks 444 and 446.

If the watchdog timer continues to receive the heart bit signals from processor 402' and host interface 408', the above-described action will not take place and timer 442 continues to be restarted by the heart bit signals. As shown in FIG. 11, the test message is preferably sent repeatedly (block 448) in an infinite loop. The above design will ensure that this heart bit signal is indicating that both blocks (host interface and processor) are functioning properly and capable of communication with the out side world. As long as the heart bit is active, the hardware module will remain idle.

The formatted message is sent to the bus controller 436, which takes control over the CPU bus and sends the diagnostic message out through the test mode communication controller 424 in FIG. 9, where the controller 424 may be a universal asynchronous receiver-transmitter ("UART"). Controller 424 in turn bypasses the host interface 408' and sends the diagnostic message out through the host interface channel 410.

Output Channel Selection

One of the innovations of the applicants is a smart and automatic selection of the output channel for the diagnostic commands. The card can send the information either through the test channel or the standard host interfaces, based on the card package and bus configuration status, and to select the appropriate data channel in the host interface, when more than one data channel is available in the host interface.

As long as the controller is packaged in a development configuration the test channel is exposed to the outside world and the test mode communication controller will transmit the data through the test channel. When the controller is packaged in a real card form factor where only the functional host interface is available, the test mode communication controller will transmit the information over the host interface. A special "package configuration" signal coming into the test mode communication controller from the package (see FIG. 9) pins will indicate the package configuration and will determine the output channel. In product level package this pin (not shown) is not exposed and its value will be set, for example, by a pull-up or pull-down resistor (not shown) implemented in the controller chip.

The transmission of the diagnostic data does not follow the product protocol of the product host interface. Therefore care is taken when this information is transmitted while a real card host is connected on the bus. Detecting the current host bus configuration and function (as well the existence of other channels, as in the card embodiments described above with input-output modules) is one of the standard functions performed by the host interface. Current information is reported on line 458 to the test mode communication controller 424 (see FIG. 9) through connection 458. The test mode communication controller will use this information to transmit the data over signal lines not currently used by the host.

For the SD and memory stick product lines the card bus can use either a single or 4 data lines. The test mode communication controller 424 will use the most significant bit (MSB) of the data bus, while the host is using the least significant bit (LSB) of the data bus only, in a single data line mode. For the card embodiments described above with input-output modules, the communication lines 241 in FIG. 6A and the control bus with signal lines A, B and/or C in bus 333 of FIG. 7A can be used as an alternate host interface. For memory stick products, the command/response ("CMD") line 22 indicated in FIG. 1 may carry the bus-state signal instead of the command/response signal.

According to one aspect of the invention, the memory card system of FIG. 9 automatically selects the proper output channel for sending the diagnostic commands.

The above-described functionalities and operation of the memory card system in reference to FIGS. 9-11 may be used in any one of the card formats referenced above, including the MMC, the SD. Thus, where there is only a single data line in the host interface channel 410, as in the case of the MMC card, such data line may be used for the transmission and transfer of the self test or status message signals from the formatting block 434 in FIG. 10.

As described above, the SD card format provides more than one data lines for data transfer. In the SD data card protocol, up to four data lines are provided. Where not all of the data lines are used for data transfer, such as where only one of the four data lines is so used, the extra data lines that are not used for data transfer may be used for the transmission of the test message. In this manner, the real life operation of the card may be tested while it is being used for storing or retrieving data. This may provide valuable information for failure analysis. In the embodiment of FIG. 6B where an additional input-output card 237 is provided, additional communication channels A, B, C of lines 333 are provided. In the embodiment of FIG. 6A, additional communication channels 241 are provided. These additional data lines or communication lines may be used also for the transmission of the test message. In this manner, it is possible to use four or more data lines simultaneously for data transfer while testing the card. Where it is desirable for there to be two-way communication in the test message transfer, these extra data or communication channels may be used for duplex communication, where one line is used for the block 420 to send test messages to the host interface channel, and the other line used for the block 420 to receive control or command messages from the host interface channel.

The flow chart of FIG. 12 summarizes the process of selecting the output channel and transmitting the debug information, as being executed by the test mode communication controller 424.

FIG. 12 is a flow chart illustrating the operation of the test mode communication controller 424. Since the system 450 of FIG. 9 may be tested both before and after encapsulation, the system may be tested through two different channels, depending upon whether it has been encapsulated. Before it has been encapsulated, different components of the system 450 (either in the form of discrete components or in the form of an integrated circuit chip) may be placed in a test package on a circuit board provided with test channel 454 in FIG. 9. In such event, the system may be tested through the test channel rather than the host interface channel 410 or the SDIO channel, as described below.

In reference to FIG. 12, controller 424 upon startup first tests whether the memory card system 450 is in a test package (diamond 452). If the system is still in a test package, controller 424 selects the test channel 454 (block 456). If the memory card system 450 is no longer in the test package that has been encapsulated, the only communication between the outside world and the components of the system 450 is through the host interface channel 410 so that the controller 424 selects channel 410.

Controller 424 proceeds to check whether the host is using a single line for data transfer. See diamond 460. If the host is using a single data line for data transfer, controller 424 selects the host interface channel 410 for transfer of the test message (block 466). Since the host is using only a single data line for the data transfer, a different data line than the one being used for data transfer may then be used for transfer of the test message so that there is no conflict between the data transfer and transfer of the test message.

When the host is using more than one data line for data transfer, controller 424 then checks to see whether any other channel is available for transfer of the test message. Thus, in the case of an SD card with an input-output module 237 as illustrated in FIGS. 6A-7B, one or more of the communication lines A-C (333 in FIGS. 7A and 9) (which are indicated as "SDIO" or "SDIO control channel" in diamond 468 and block 470 in FIG. 12) or 241 may be used for such purpose. (Diamond 468, block 470). If all four data lines in the SD card are being used for data transfer and no expansion slot or wireless channel 241 is available, the test channel 454 may be selected as an alternative, which may be useful if the test channel is accessible from outside the housing. Alternatively, the test data may be sent through one or more of the four data lines already in use, so that the host may become aware of this and switch to a mode where fewer than four data lines are used for data transfer. The test data can then be sent over the data line(s) that have become available. The advantage of incorporating the above described features of the invention in FIGS. 9-11 in an SD card with extra communication channels A-C or 241 is that the self-testing may be performed when all four data lines are being used for data transfer. Controller 424 again proceeds to diamond 462 and block 464 to check whether the diagnostic data is ready and to send the data out repeatedly.

Controller 424 determines whether the host is using a single line or multiple lines or whether other data bus is available for the test message transfer from the host bus controller signals from the host interface 408' on signal lines 458.

Diagnostic Package Format

While the diagnostic messages are being transmitted by the card controller and FW we can define and use a standard UART message protocol. However when the HW status module 420 takes over we need to resort to a much simpler protocol. Using a simpler protocol (e.g. one without requiring handshake) has the advantage of making it simpler for tool design as well as reducing the number of signals required for communicating with the memory card.

In one embodiment, to save signal line only a single output signal line is used for transmitting diagnostic data to outside of the card. Therefore the card has no way to get control signals from the host side and cannot tell whether the receiver is active and listening. The HW status module 420, therefore, will transmit the diagnostic package repeatedly and the host will have to independently (without hand shake with card) synchronizes on the out coming packet.

Figure 13B:
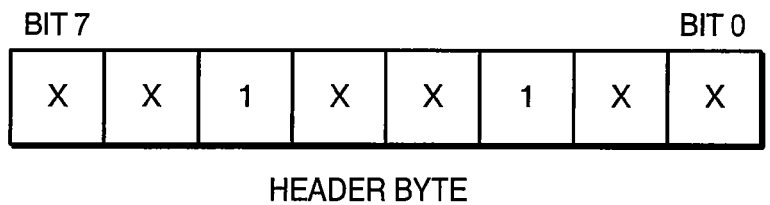
FIG. 13B is a schematic view of the header portion of a test message and FIG. 13C is a schematic view of the message content of the test message to illustrate an embodiment of the invention.
Figure 13C:
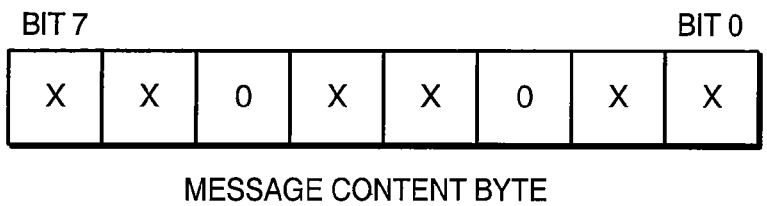

Byte start will be indicated by a start bit (e.g. '0'), after a long gap (e.g. 100 idle or '1' bits). In order to enable the receiver on the host side to find the first byte of the diagnostic message, the message packet will contain a predefined header as described in FIG. 13A. To ensure reliable synchronization on the message header, the message format will be designed so that the message content does not contain byte values identical to the header bytes. This is done by setting a couple of header bits, in each header byte, to logical '1' (as depicted in FIG. 13B) while the corresponding bits in the message content bytes (every byte) are set to logical '0' (as depicted in FIG. 13C). X bits in the header format are set to arbitrary values during chip design. X bits in the message header will indicate HW status of various blocks.

A flow chart describing the search algorithm on the host side is given in FIG. 14. The host will read 1 byte of data and determine whether the byte content is part of the header (block 502). If it is not, then the host waits for a start bit after 100 idle bits and reads another byte. Diamond 504. This process is repeated until a complete header is found (diamond 506). The message length and test message are then read (blocks 508, 510).

While the invention has been described above by reference to various embodiments, it will be understood that changes and modifications may be made without departing from the scope of the invention, which is to be defined only by the appended claims and their equivalent. All references referred to herein are incorporated herein by reference.

We claim:

1. A memory system, comprising:
    a programmable non-volatile memory;
    a controller;
    a plurality of data contacts configured to connect the memory system to a host system external to the memory system, wherein the controller controls the data contacts in one or more modes of operation and
    a circuit configured to select one or more of the data contacts to transfer test data and to transfer the test data through the one or more of the data contacts for diagnosis, wherein the circuit transfers the test data for diagnosis when the controller is not operating normally.

2. The system of claim 1, wherein during the one or more modes of operation, less than all of the data contacts is used for data transfer between the memory and the host system, at least one of remaining data contacts is used by the circuit for test data transfer.

3. The system of claim 1, wherein the circuit interrogates internal operational data of the controller and generates the test data in response thereto.

4. The system of claim 1, further comprising a housing encapsulating the memory and controller, so that the encapsulated memory and controller are accessible only through the data contacts without removing the housing;
    wherein the housing is in the form of a card with an expansion slot adapted for connection with an expansion card; and
    wherein at least one of the data contacts is located at or close to the slot and adapted for connection with the expansion card.

5. The system of claim 4, wherein one or more of the data contacts is used for data transfer between the system and the host system, and wherein at least one of remaining data contacts located at or close to the slot and adapted for connection with the expansion card is used for test data transfer.

6. The system of claim 1, wherein the controller comprises a processor, firmware stored in a memory, an interface with a host system, data buffers, and flash control circuit.

7. The system of claim 1, wherein the controller comprises a status circuit; and
    wherein the circuit interrogates the status circuit in order to determine whether the controller is operating normally.

8. The system of claim 1, wherein the system communicates through one of a plurality of data channels; and
    wherein the circuit is configured to select one of the plurality of data channels to transfer the test data.

9. The system of claim 8, wherein the circuit is configured to select the one of the plurality of data channels based on bus configuration status.

10. The system of claim 1, wherein the circuit is configured to receive a signal; and
    wherein the circuit is configured to select the one or more of the data contacts to transfer test data based on the received signal.

11. The system of claim 10, wherein the received signal is indicative of a package configuration.

12. The system of claim 1, wherein the circuit is configured to select one or more of the data contacts to transfer the test data based on a card package.

13. A method for testing a memory system, the memory system comprising a programmable non-volatile memory, a controller, a plurality of data contacts configured to connect the memory system to a host system external to the memory system, and a test circuit, the method comprising:
    controlling, by the controller, the data contacts in one or more modes of operation;
    detecting that the controller is not operating normally;
    selecting, by the test circuit, at least one of the data contacts to transfer test data; and transferring test data through the at least one of the data contacts for diagnosis,
wherein the transferring transfers the test data for diagnosis when the controller is detected to be not operating normally.

14. The method of claim 13, wherein the memory system comprises a plurality of data channels; and
wherein selecting at least one of the data contacts to transfer the test data comprises selecting one of the plurality of data channels to transfer the test data.

15. The method of claim 14, wherein selecting at least one of the data contacts to transfer the test data comprises selecting the one of the plurality of data channels based on bus configuration status.

16. The method of claim 13, further comprising receiving a signal; and
wherein selecting at least one of the data contacts to transfer the test data comprises selecting the one or more of the data contacts based on the received signal.

17. The method of claim 16, wherein the received signal is indicative of a package configuration.

18. The method of claim 13, wherein selecting at least one of the data contacts to transfer the test data comprises determining whether to transfer the test data through a test channel or through a host interface.

19. The method of claim 13, wherein selecting at least one of the data contacts to transfer the test data comprises selecting the at least one of the data contacts based on a card package.

20. The method of claim 13, wherein selecting at least one of the data contacts to transfer the test data comprises selecting the at least one of the data contacts based on bus configuration status.

21. The method of claim 13, wherein the controller comprises a status circuit; and
wherein detecting that the controller is not operating normally includes interrogating the status circuit in order to determine whether the controller is operating normally.

* * * * *